(12) United States Patent
Counterman

(10) Patent No.: US 8,868,915 B2
(45) Date of Patent: Oct. 21, 2014

(54) SECURE AUTHENTICATION FOR CLIENT APPLICATION ACCESS TO PROTECTED RESOURCES

(75) Inventor: Raymond C. Counterman, Canton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 570 days.

(21) Appl. No.: 12/960,956

(22) Filed: Dec. 6, 2010

(65) Prior Publication Data

US 2012/0144202 A1  Jun. 7, 2012

(51) Int. Cl.
*H04L 9/32* (2006.01)
*H04L 29/06* (2006.01)
*G06F 21/62* (2013.01)
*G06F 21/44* (2013.01)
*G06F 21/33* (2013.01)

(52) U.S. Cl.
CPC ............ *G06F 21/335* (2013.01); *H04L 9/3228* (2013.01); *H04L 63/062* (2013.01); *G06F 21/6281* (2013.01); *G06F 21/44* (2013.01); *H04L 2209/42* (2013.01); *H04L 63/1466* (2013.01); *G06F 2221/2129* (2013.01); *H04L 63/0876* (2013.01)
USPC .................................. 713/176; 726/6; 726/9

(58) Field of Classification Search
CPC ... G06F 21/44; G06F 21/335; G06F 21/6281; G06F 2221/2129; H04L 2209/42; H04L 9/3228; H04L 3/1466; H04L 63/0876; H04L 63/062
USPC ....................................... 726/6, 4, 9; 713/176
See application file for complete search history.

(56) References Cited

U.S. PATENT DOCUMENTS

| | | | |
|---|---|---|---|
| 2005/0091544 A1* | 4/2005 | Lambert | 713/202 |
| 2005/0251681 A1* | 11/2005 | Robles et al. | 713/172 |
| 2006/0272011 A1* | 11/2006 | Ide et al. | 726/5 |
| 2009/0271847 A1* | 10/2009 | Karjala et al. | 726/6 |
| 2009/0300744 A1* | 12/2009 | Guo et al. | 726/7 |
| 2009/0328207 A1* | 12/2009 | Patel | 726/22 |
| 2011/0283347 A1* | 11/2011 | Bhuta et al. | 726/9 |

* cited by examiner

*Primary Examiner* — Harunur Rashid

(57) ABSTRACT

An authorization server receives a request for an access token, for accessing a protected resource, from a client application executing on a device, wherein the request includes a client identifier that uniquely identifies the client application and a device identifier that uniquely identifies the device. The authorization server performs authentication of the client identifier and the device identifier. The authorization server returns a valid access token to the client application, based on the authentication of the client identifier and the device identifier, to enable the client application access to the protected resource.

20 Claims, 12 Drawing Sheets

US 8,868,915 B2

SECURE AUTHENTICATION FOR CLIENT APPLICATION ACCESS TO PROTECTED RESOURCES

BACKGROUND

Many client applications resident on a device, such as a mobile phone or a desktop computer, need access to a user's or a network's protected data or resources. The problem for the resource owner (e.g., the user or network) is whether the resource owner can trust the client application requesting access to the data or resources.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

As mentioned above, a client application may have a credential that must be authenticated for the client application to be granted permission to access one or more of the resources. However, a security problem may exist when there are a large number of devices which host the same client application having the same credential. Because the client application and credential is replicated many times, there is a greater likelihood that a party may modify one of the replicated client applications and use the original client application's credentials to gain unauthorized access resources. If such a modified client application, called a "rogue application," is not authentic, information may be misused or harm maybe inflicted on the owner of the protected resources. Exemplary embodiments described herein may enable the secure authentication of a client application prior to permitting the client application access to protected data. As described herein, a client application identifier and a device identifier previously assigned to the client application, and the device on which the client application is installed, may be used in an Authentication and Key Agreement (AKA) process by an authorization server to authenticate the client application. Upon authentication by the authorization server, the authorization server may supply a valid access token that the client application may use to access data stored at a protected resource. The client application identifier may include a unique identifier assigned to the client application by, for example, an authentication protocol (e.g., OAuth 1.0). The device identifier may include a unique identifier assigned to the device by, for example, a network service provider. For example, the device identifier may include an International Mobile Subscriber Identity (IMSI), an International Mobile Equipment Identities (IMEI), a Mobile Equipment Identifier (MEID), an Electronic Serial Number (ESN), a Mobile Station International Subscriber Directory Number (MSISDN), a Medium Access Control (MAC) address, or an Internet Protocol Multimedia Subsystem Private Identifier (IMPI).

Figure 1:
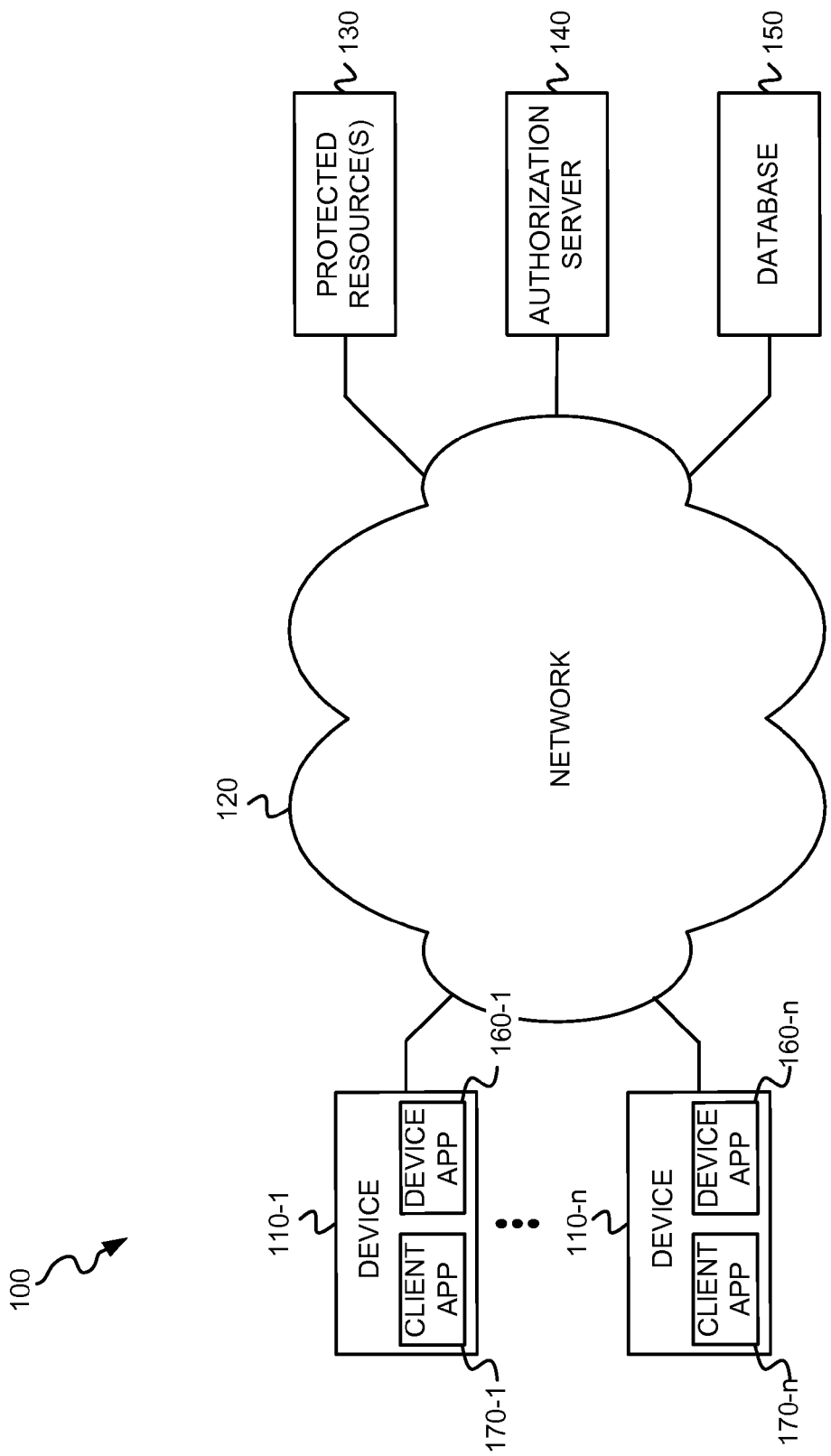
FIG. 1 is a diagram that depicts an exemplary environment in which device and client application authentication may occur to permit access to protected resources by the client application.

FIG. 1 is a diagram that depicts an exemplary environment 100 in which device and client application authentication may occur to permit access to protected resources by the client application. As shown in FIG. 1, environment 100 may include multiple devices 110-1 through 110-n (where n is ≥2) (generically and individually referred to herein as a "device 110"), a network 120, a protected resource(s) 130, an authorization server 140, and a database 150. Each of devices 110-1 through 110-n may further include respective device applications 160-1 through 160-n (generically and individually referred to herein as "device application 160") and respective client applications 170-1 through 170-n (generically and individually referred to herein as "client application 170"). Though each device 110 is depicted as including a single client application 170 in FIG. 1, multiple client applications may reside on each device 110.

Devices 110-1 through 110-n may each include any type of electronic device having communication capabilities, which may further include a respective device application 160, and one or more client applications 170 that may request access to data stored at protected resources 130. Devices 110-1 through 110-n may each include, for example, a cellular radiotelephone, a smart phone, a personal digital assistant (PDA), a set-top box (STB), an analog terminal adaptor (ATA), a mobile phone, a Voice over Internet Protocol (VoIP) device, a laptop computer, a palmtop computer, a gaming device, a media player device, a tablet computer, or a digital camera that includes communication capabilities (e.g., wireless communication mechanisms)

Network 120 may include one or more networks of any type, such as, for example, a telecommunications network (e.g., a Public Switched Telephone Network (PSTN)), a local area network (LAN), a wide area network (WAN), a metropolitan area network (MAN), an intranet, the Internet, a wireless satellite network, a cable network (e.g., an optical cable network), and/or one or more wireless public land mobile networks (PLMNs). The PLMN(s) may include a Code Division Multiple Access (CDMA) 2000 PLMN, a Global System for Mobile Communications (GSM) PLMN, a Long Term Evolution (LTE) PLMN and/or other types of PLMNs not specifically described herein.

Protected resource(s) 130 may include one or more devices that stores data that is protected from unauthorized access by client applications. Limited access by a given one of client applications 170-1 through 170-n may be authorized using authentication techniques (e.g., authentication and key agreement (AKA) techniques) described herein.

Authorization server 140 may include a server entity that may implement techniques, described herein, for authenticating a client application, and the corresponding device upon which the client application is installed, that requests access to data stored at protected resource 130.

Database 150 may include a device and/or memory unit for storing a data structure (e.g., a database) that further stores client and device credentials used during the authentication techniques described herein. Authorization server 140 may retrieve client and device credentials from database 150. Database 150 may include a device and/or memory unit that is separate from server 140, or database 150 may include a device and/or memory unit that is integral to server 140 (or another device included in environment 100). Database 150 may further include distributed devices and/or memory units such that database 150 includes a distributed database.

Each of device applications 160-1 through 160-n may be executed by any type of smart module (e.g., smart card) usable for inserting into a respective device 110 and for storing data relevant to the operation of device 110. Each of device applications 160-1 through 160-n may be executed by a smart card including, for example, a Universal Integrated Circuit Card (UICC), a removable user identity card (R-UIM), a subscriber identity module (SIM), a universal subscriber identity module (USIM), or an Internet Protocol (IP) multimedia services identity module (ISIM). In other implementations, the smart module may include a Trusted Computing Group (TCG) Trusted Platform Module (TPM), which may include a semiconductor intellectual property core or integrated circuit that conforms to the TPM specification and which may be included with computers to enable trusted computing features. In other implementations, each of device applications 160-1 through 160-n may include instructions that are stored in a memory (e.g., main memory 230, ROM 240, storage device 250) and which may be executed by a respective processing unit of a respective device 110. Device application 160 may store data within device 110 in a region not accessible (e.g., memory 320) to client application 170. The data not accessible to client application 170 may include, for example, device credentials used in authenticating device 110.

Each of client applications 170-1 through 170-n may include a client application that may be installed on a respective device 110, and which may request access to data stored at protected resource 130 via network 120. Each of client applications 170-1 through 170-n may perform various functions on a respective device 110 using, for example, data requested from protected resource 130. Though only a single client application 170 is shown as included in each device 110 of FIG. 1, multiple different clients 170 may be implemented at each device 170.

Figure 2:
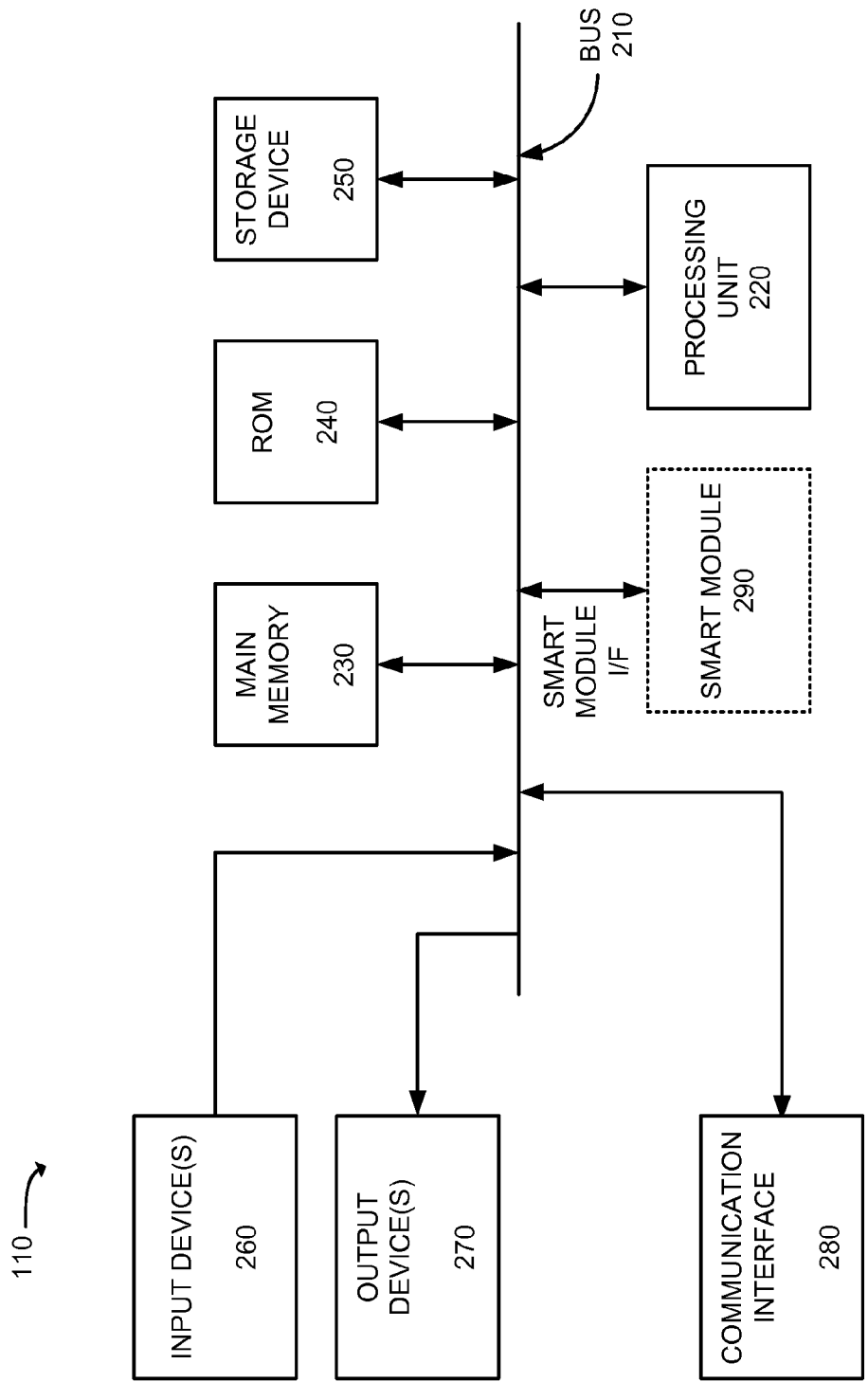
FIG. 2 is a diagram of exemplary components of the devices of FIG. 1.

FIG. 2 is a diagram of exemplary components of device 110. Device 110 may include a bus 210, a processing unit 220, a main memory 230, a read only memory (ROM) 240, a storage device 250, an input device(s) 260, an output device (s) 270, a communication interface 280 and a smart module 290. Bus 210 may include a path that permits communication among the elements of device 200. As further shown in FIG. 2, smart module 290 may be inserted into a smart module interface (I/F) (e.g., a smart card interface (I/F)) of device 110. Authorization server 140 may be configured similarly to device 110 shown in FIG. 2.

Processing unit 220 may include a processor, microprocessor, or processing logic that may interpret and execute instructions. Main memory 230 may include a random access memory (RAM) or another type of dynamic storage device that may store information and instructions for execution by processing unit 220. ROM 240 may include a ROM device or another type of static storage device that may store static information and instructions for use by processing unit 220. Storage device 250 may include a magnetic and/or optical recording medium and its corresponding drive.

Input device(s) 260 may include one or more mechanisms that permit an operator to input information to device 200, such as, for example, a keypad or a keyboard, voice recognition and/or biometric mechanisms, etc. Output device(s) 270 may include one or more mechanisms that output information to the operator, including a display, a speaker, etc. Communication interface 280 may include any transceiver mechanism that enables device 200 to communicate with other devices and/or systems. For example, communication interface 280 may include mechanisms for communicating with another device or system via a network, such as network 120. Smart module 290 may be insertable into device 110 via a smart module I/F, may store data relevant to the operation of device 110, and may execute a device application 160. Smart module 290 may include, for example, a Universal Integrated Circuit Card (UICC), a removable user identity card (R-UIM), a subscriber identity module (SIM), a universal subscriber identity module (USIM), or an Internet Protocol (IP) multimedia services identity module (ISIM).

Device 110 may perform certain operations or processes, as may be described in detail below. Device 110 may perform these operations in response to processing unit 220 executing software instructions contained in a computer-readable medium, such as memory 230. A computer-readable medium may be defined as a physical or logical memory device. A logical memory device may include memory space within a single physical memory device or spread across multiple physical memory devices.

The software instructions may be read into main memory 230 from another computer-readable medium, such as storage device 250, or from another device via communication interface 280. The software instructions contained in main memory 230 may cause processing unit 220 to perform operations or processes that will be described later. Alternatively, hardwired circuitry may be used in place of or in combination with software instructions to implement processes consistent with the principles of the invention. Thus, exemplary implementations are not limited to any specific combination of hardware circuitry and software.

The configuration of components of device 110 illustrated in FIG. 2 is for illustrative purposes only. It should be understood that other configurations may be implemented. Therefore, device 110 may include additional, fewer and/or different components than those depicted in FIG. 2.

Figure 3:
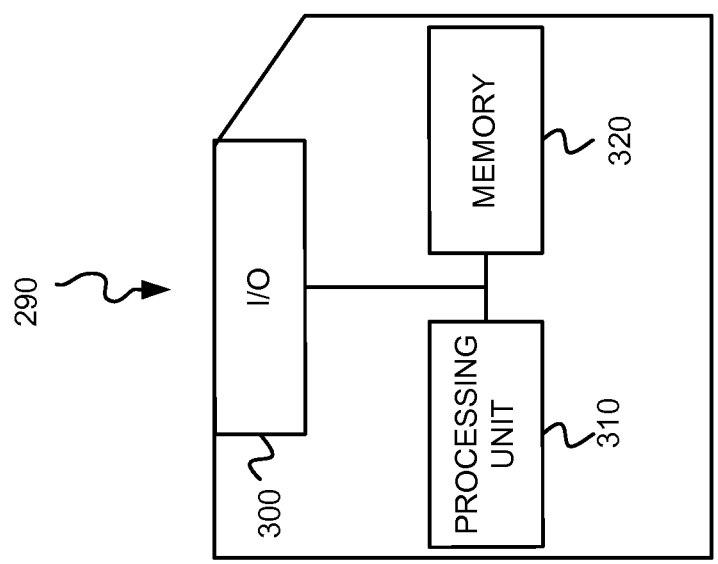
FIG. 3 is a diagram that depicts exemplary components of a smart module that may implement a device application of FIG. 1.

FIG. 3 is a diagram that depicts exemplary components of smart module 290. Smart module 290 may include input/output circuitry 300, a processing unit 310, and a memory 320. Input/output circuitry 300 may include circuitry for inputting data to smart module 290 from device 110, and output circuitry for outputting data from smart module 290 to device 110. Processing unit 310 may include a processor, microprocessor, or processing logic that may interpret and execute instructions. For example, processing unit 310 may interpret and execute instructions for device application 160. Memory 320 may include RAM, ROM, and/or Electrically Erasable Programmable Read-Only Memory (EEPROM) that may store data (e.g., device credentials), and may store instructions for execution by processing unit 310.

Smart module 290 may perform certain operations or processes, as may be described in detail below. Smart module 290 may perform these operations in response to processing unit 310 executing software instructions contained in a computer-readable medium, such as memory 320.

The software instructions contained in memory 320 may cause processing unit 310 to perform operations or processes described below. Alternatively, hardwired circuitry may be used in place of or in combination with software instructions to implement processes consistent with the principles of the invention. Thus, exemplary implementations are not limited to any specific combination of hardware circuitry and software.

The configuration of components of smart module 290 illustrated in FIG. 3 is for illustrative purposes only. It should be understood that other configurations may be implemented. Therefore, smart module 290 may include additional, fewer and/or different components than those depicted in FIG. 3.

Figure 4:
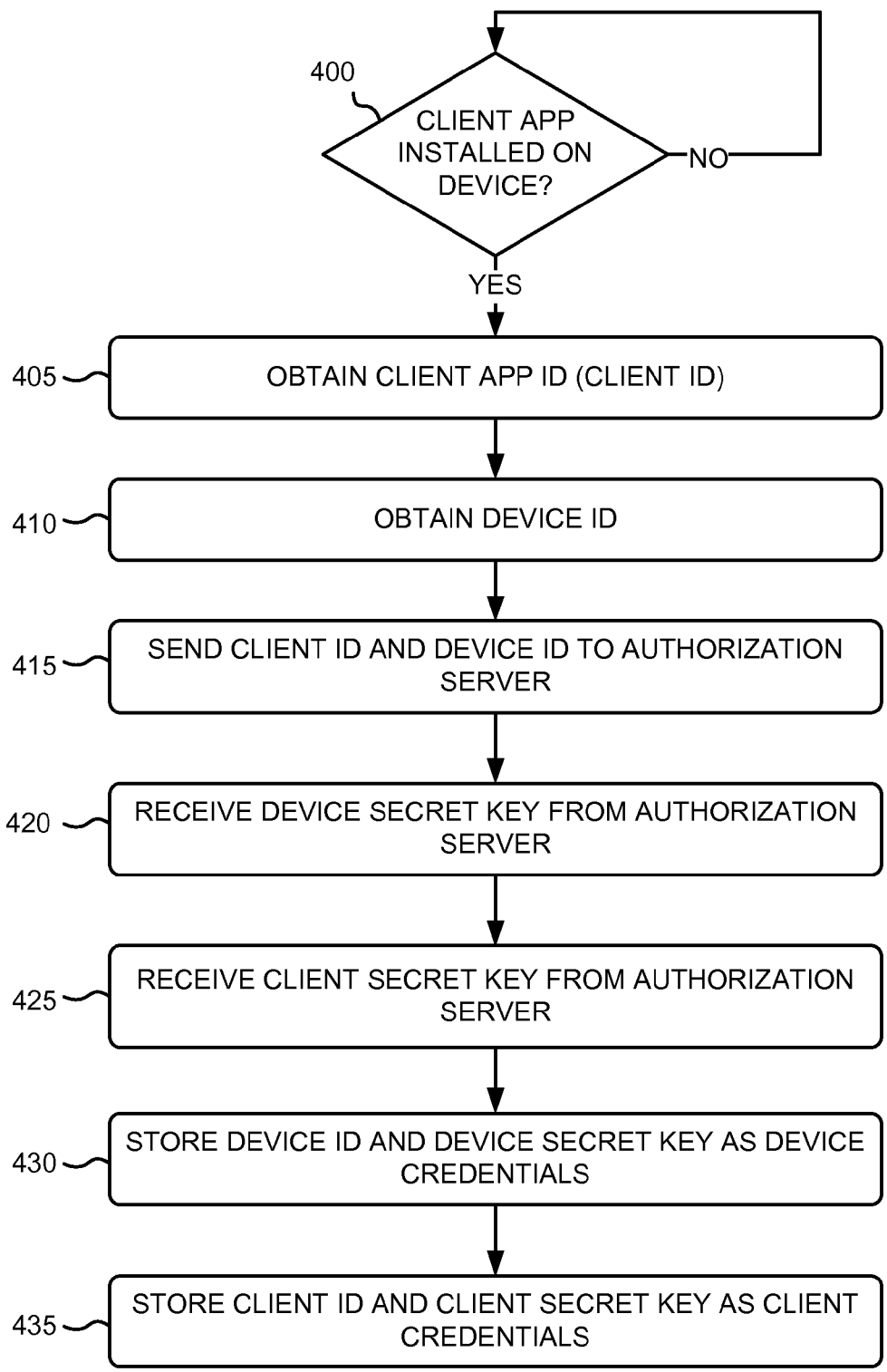
FIG. 4 is a flow diagram illustrating an exemplary process for obtaining a device identifier, a client application identifier associated with a client application installed on a device, a device secret key, and a client secret key for storing as client application and device credentials on a device that can be used in an authentication process for authenticating both the device and the client application when the client application requests access to a protected resource.
Figure 5:
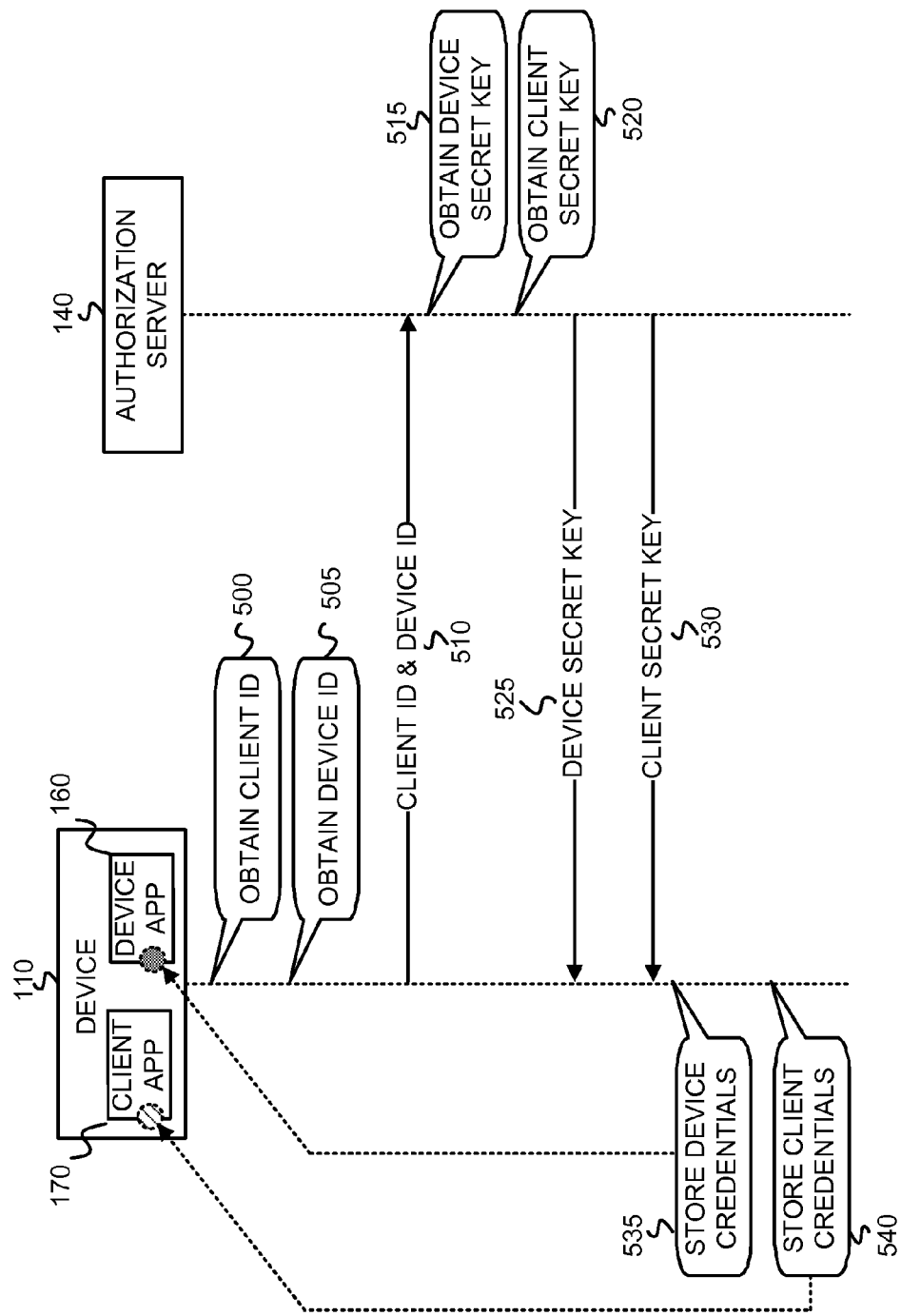
FIG. 5 is an exemplary messaging diagram associated with the exemplary process of FIG. 4.

FIG. 4 is a flow diagram illustrating an exemplary process for obtaining a device identifier that uniquely identifies a device, a client application identifier associated with a client application installed on the device, a device secret key, and a client secret key for storing as client application and device credentials on the device and that can be used in an authentication process for authenticating both the device and the client application when the client application requests access to a protected resource. The exemplary process of FIG. 4 may be implemented by device 110. The description of the exemplary process of FIG. 4 below may refer to the exemplary messaging diagram of FIG. 5.

The exemplary process may include determining whether a client application has been installed on device 110 (block 400). One or more client applications may be installed at various times on device 110. Some of the installed client applications may include functionality that requires access to data stored at protected resource(s) 130 to perform certain operations.

If a client application has been installed on device 110 (YES—block 400), then a client application identifier (client ID) may be obtained (block 405). At each installation of a client application, processing unit 220 may determine whether the client application includes functionality that requires access to data stored at protected resource(s) 130 and, if so, may obtain a client ID. The client ID may include a unique identifier for identifying client application 170 from other client applications. The client ID may be obtained, for example, via the OAuth protocol (e.g., OAuth 1.0). As one example, client application 170 may be identified with the client ID "123456789AHX" by the OAuth protocol. Referring to the messaging diagram of FIG. 5, device 110 is depicted as obtaining 500 a client ID.

A device identifier (device ID) may then be obtained (block 410). The device identifier may be stored, for example, in memory 320 of smart module 290 (e.g., a smart card) for retrieval by device 110. The device ID may include a unique identifier for identifying device 110 from other devices. The device ID may include, for example, an International Mobile Subscriber Identity (IMSI), an International Mobile Equipment Identity (IMEI), a Mobile Equipment Identifier (MEID), an Electronic Serial Number (ESN), or a Mobile Station International Subscriber Directory Number (MSISDN). Other types of identifiers may be used for uniquely identifying device 110. Referring again to the messaging diagram of FIG. 5, device 110 is depicted as obtaining 505 a device ID.

The client ID and device ID may be sent to authorization server 140 (block 415). As shown in the messaging diagram of FIG. 5, device 110 sends a message 510 that includes a client ID and device ID to authorization server 140. A device secret key may be received from authorization server 140 (block 420). As shown in the messaging diagram of FIG. 5, in response to receiving the message 510 with the client ID and device ID from device 110, authorization server may obtain 515 a device secret key, and may return a message 525 that includes the device secret key to device 110. The device secret key may include key material that may be used for authenticating device 110. The key material for the device secret key may be generated using known techniques for generating keys for cryptographic algorithms.

A client secret key may be received from authorization server 140 at device 110 (block 425). As shown in the messaging diagram of FIG. 5, in response to receiving the message 510 with the client ID and device ID from device 110, authorization server may obtain 520 a client secret key, and may return a message 530 that includes the client secret key to device 110. The client secret key may include key material that may be used for authenticating client application 170. The key material for the client secret key may be generated using known techniques for generating keys for cryptographic algorithms.

The device ID and device secret key may be stored as the device credentials (block 430). The device ID and device secret key may be stored, for example, in memory 320 of smart module 290. Alternatively, the device ID and device secret key may be stored, for example, in main memory 230 of device 110. As shown in the messaging diagram of FIG. 5, device 110 may store 535 the device credentials.

The client ID and client secret key may be stored as the client credentials at device 110 (block 435). The client ID and client secret key may be stored, for example, in memory 320 of smart module 290. Alternatively, the client ID and client secret key may be stored, for example, in main memory 230 of device 110. As shown in the messaging diagram of FIG. 5, device 110 may store 540 the client credentials. The stored client and device credentials may subsequently be used by device 110 in authenticating device 110 and client application 170 to authorization server 140 to enable client application access to data stored at protected resource(s) 130.

Figure 6A:
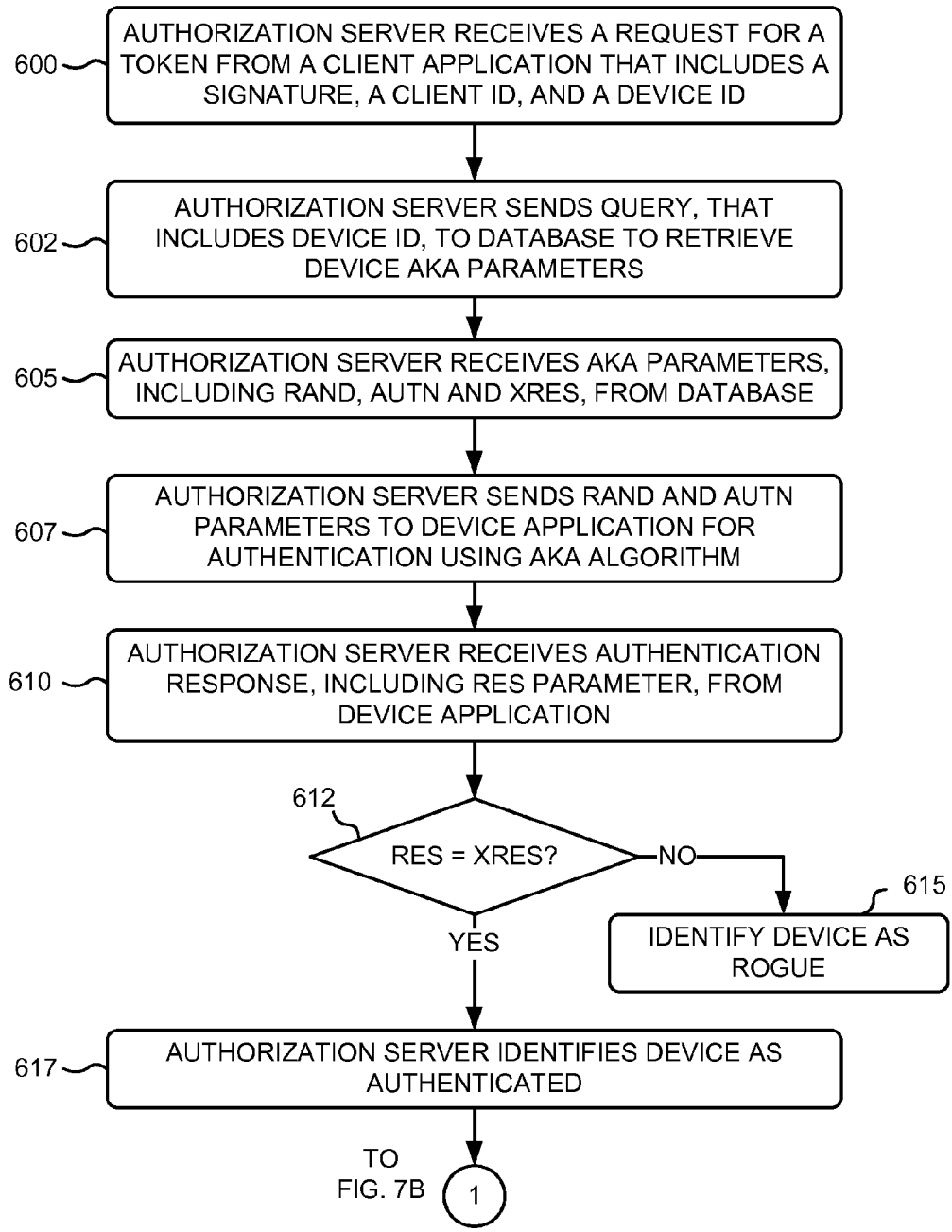
FIGS. 6A-6D are flow diagrams illustrating an exemplary process for authenticating a device and a client application installed on the device that is requesting access to a protected resource.
Figure 6B:
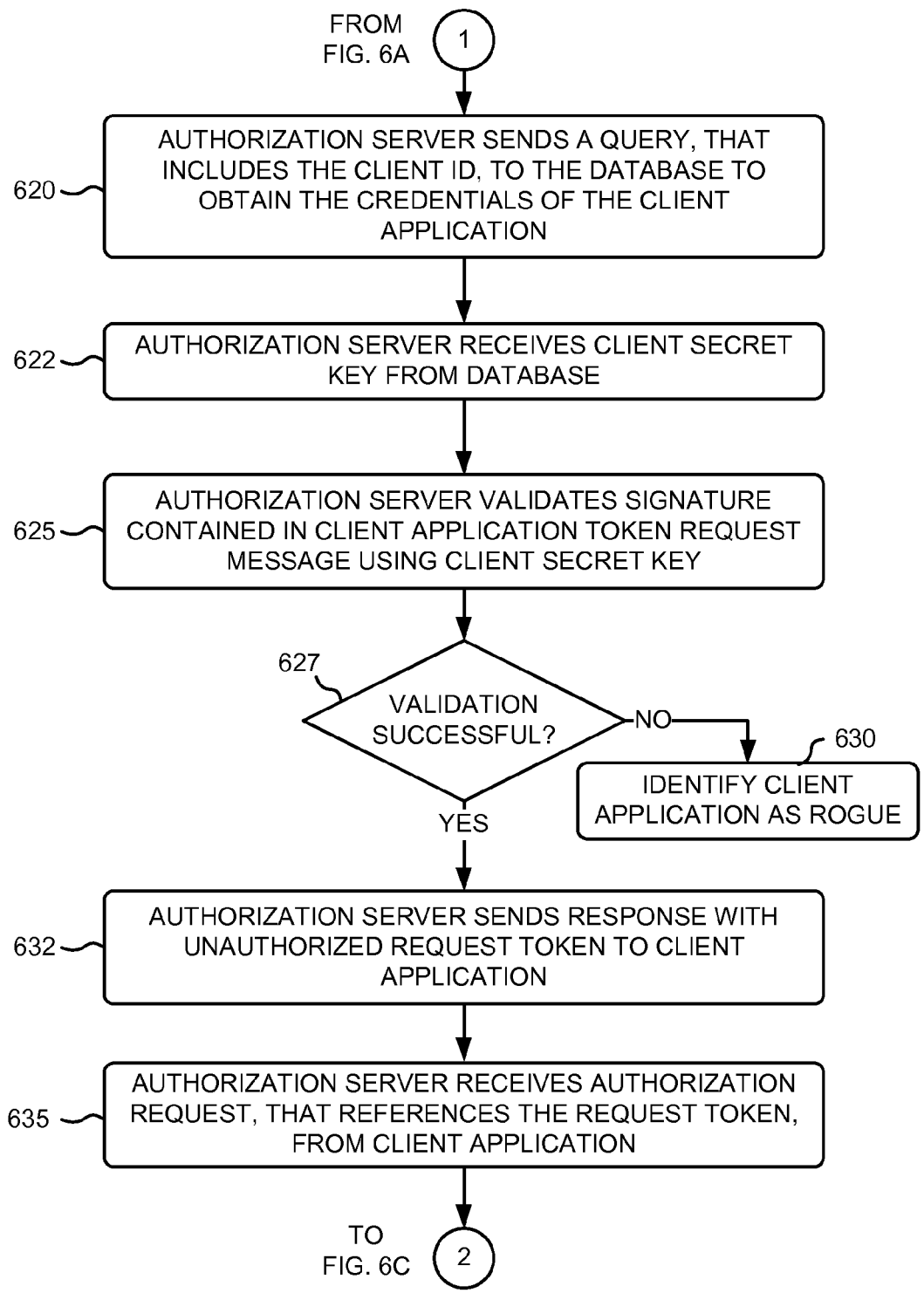
Figure 6C:
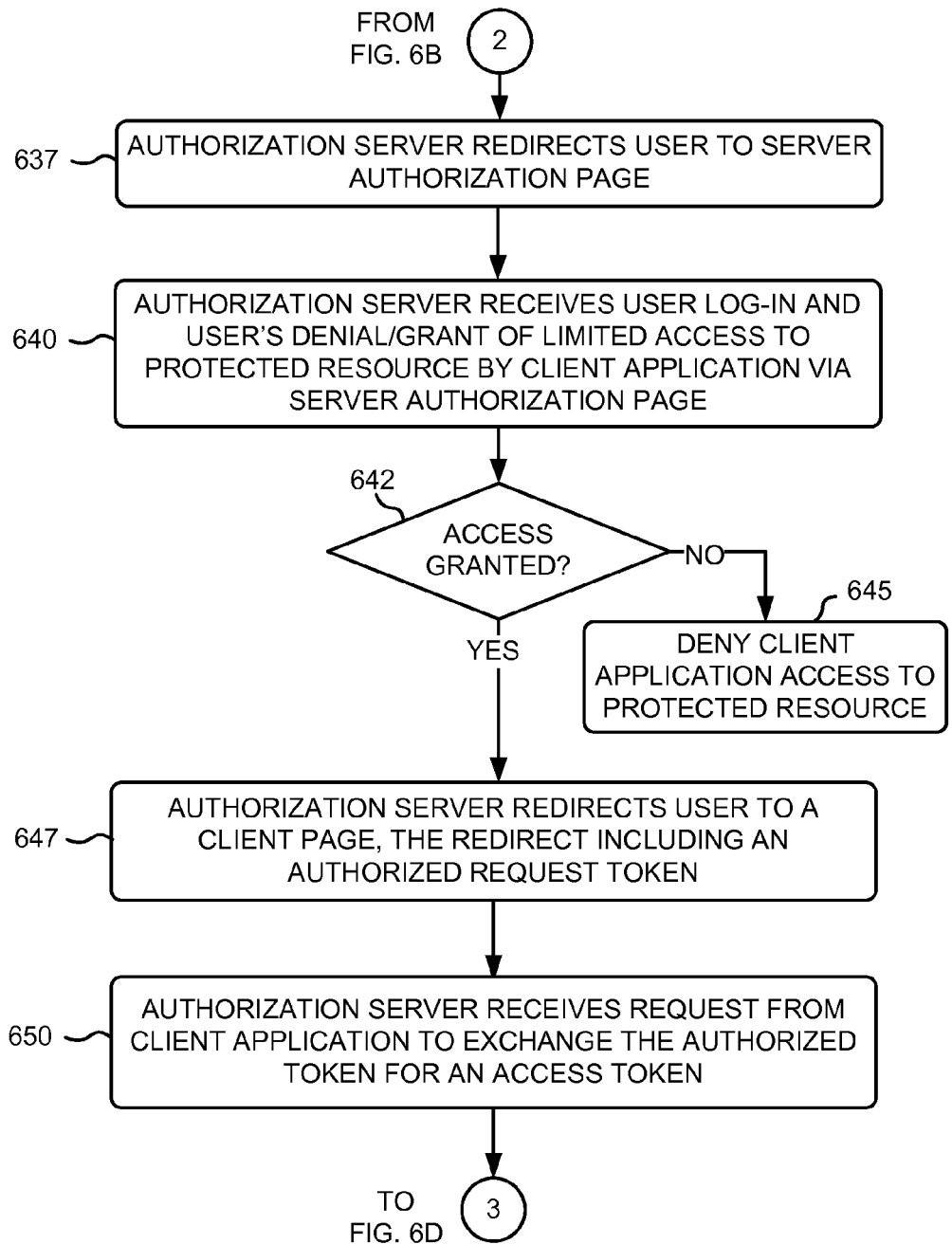
Figure 6D:
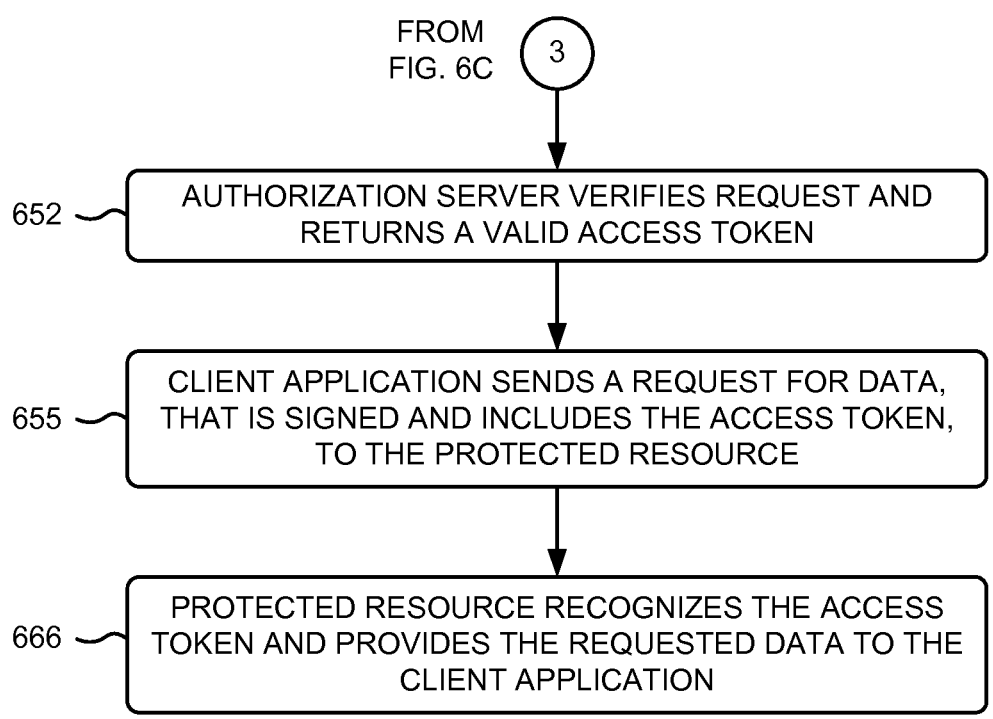

FIGS. 6A-6C are flow diagrams illustrating an exemplary process for authenticating a device, and a client application installed on the device, when the client application is requesting access to a protected resource. The exemplary process of FIGS. 6A-6C may be implemented by authorization server 140, possibly in conjunction with database 150, device 110, client application 170, device application 160, and/or protected resource(s) 130, as described further below. The description of the exemplary process of FIG. 6A-6C below may refer to the exemplary messaging diagrams of FIGS. 7-9.

The exemplary process may include receiving, at authorization server 140, a request for a token from client application 170, where the request includes a signature, a client ID, and a device ID (block 600). Device 110 may retrieve the client ID and device ID from memory (e.g., memory 320, main memory 230). Device 110 may use a signature generation technique that further uses the device secret key and/or client secret key. Various signature generation techniques may be used to generate a signature at device 110. As shown in the messaging diagram of FIG. 7, device 110 may send a token request message 710 to authorization server 140 that includes a signature, client ID, and device ID.

Authorization server 140 may send a query, which includes the device ID, to database 150 to retrieve AKA parameters associated with device 110 (block 602). As depicted in the messaging diagram of FIG. 7, authorization server 140, in response to receiving token request message 710, may send a query message 715 to database 150 that includes the device ID. Upon receipt of query message 715, database 150 may access device credentials 705 associated with the received device ID to obtain AKA parameters that correspond to that device ID. The AKA parameters may include, for example, the RAND, AUTN and XRES parameters specified in 3GPP TS 33.102. RAND includes a random challenge generated as described in 3GPP TS 33.102. AUTN includes a 128 bit authentication token generated as described in 3GPP TS 33.102. XRES includes an expected authentication response that is generated as described in 3GPP TS 33.102.

Authorization server 140 may receive the AKA parameters, including the RAND, AUTN and XRES parameters, from database 150 (block 605). As shown in the messaging diagram of FIG. 7, database 150 may send a message 720 that includes the AKA parameters RAND, AUTN, and XRES to authorization server 140.

Authorization server 140 may send the RAND and AUTN parameters to device application 160 for authentication using the AKA algorithm (block 607). Referring to the messaging diagram of FIG. 7, authorization server 140 sends a message 725 that includes the AKA parameters RAND and AUTN to device application 160 of device 110. As further shown in FIG. 7, upon receipt of message 725, device application 160 may perform 730 an authentication algorithm using RAND and AUTN to generate a RES parameter. Device application 160 may perform an authentication algorithm specified in 3GPP TS 33.102 to generate the RES parameter using the RAND and AUTN parameters. The RES parameter includes the authentication response parameter that results from the authentication algorithm.

Figure 7:
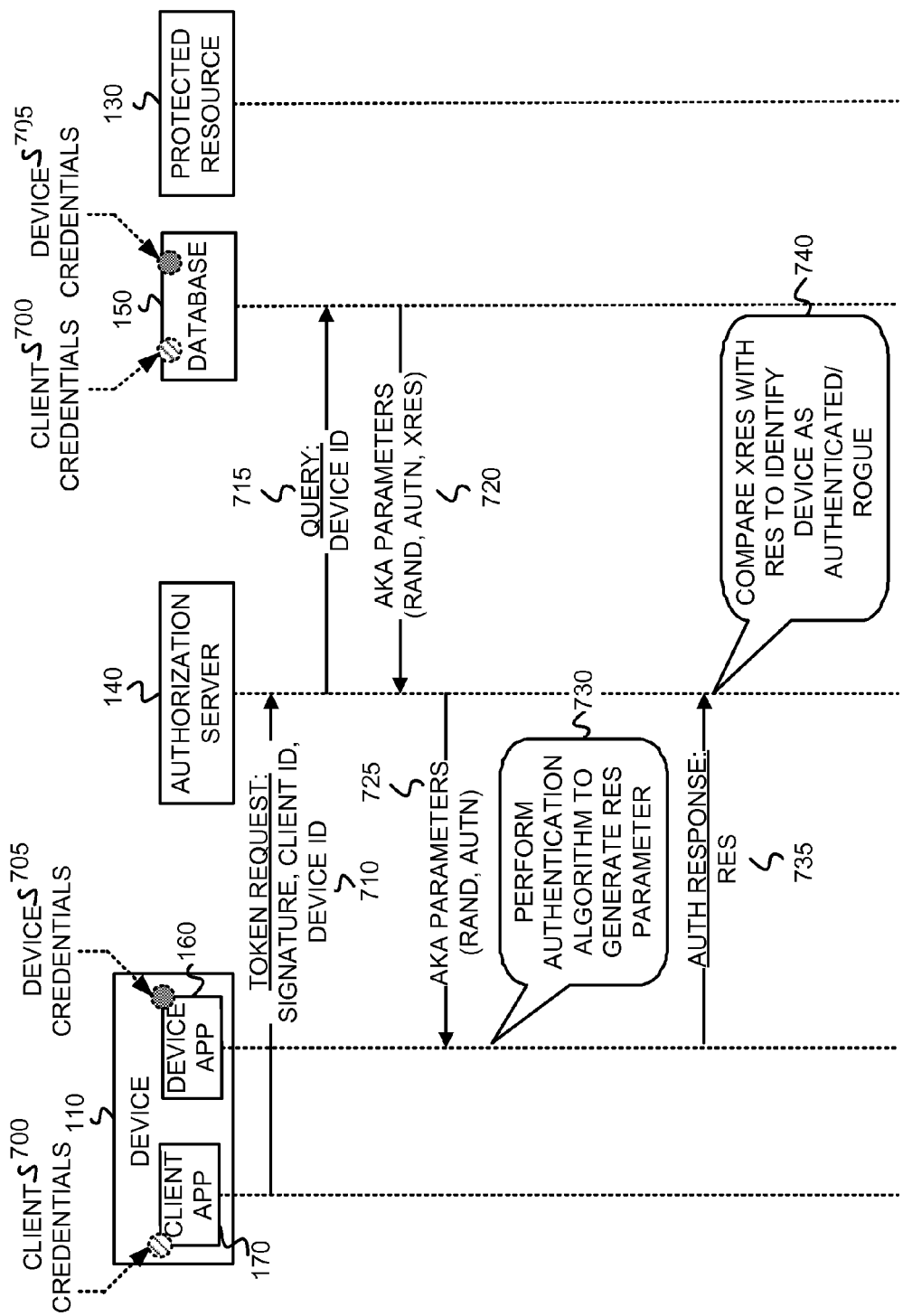
FIGS. 7-9 are exemplary messaging diagrams associated with the exemplary process of FIGS. 6A-6D.

Authorization server 140 may receive an authentication response, including the RES parameter, from device application 160 (block 610). As depicted in FIG. 7, device 110 may return an authorization response message 735 to authorization server 140 that includes the RES parameter generated by the authentication algorithm executed by device application 160 using RAND and AUTN.

A determination may be made whether the XRES parameter is equal to the RES parameter received from device application 160 (block 612). A comparison of the XRES parameter obtained from database 150 with the RES parameter returned device 110 may be made to determine if these parameters are equal, thus, indicating a valid authentication. If RES and XRES are equal, then device 110 may be considered to be authenticated. If RES and XRES are not equal, then device 110 may be considered to not be authenticated and, therefore, "rogue." If XRES is not equal to RES (NO—block 612), then device 110 may be identified as rogue (block 615). If device 110 is identified as rogue, then an authentication rejection message may be returned to device 110. If XRES is equal to RES (YES—block 612), then device 110 may be identified as authenticated (block 617). As shown in FIG. 7, authorization server 140 may receive the RES parameter in authorization response message 735, and may compare 740 the XRES parameter received from database 150 with the RES parameter received from device 110 to identify device 110 as either authenticated or rogue.

Figure 8:
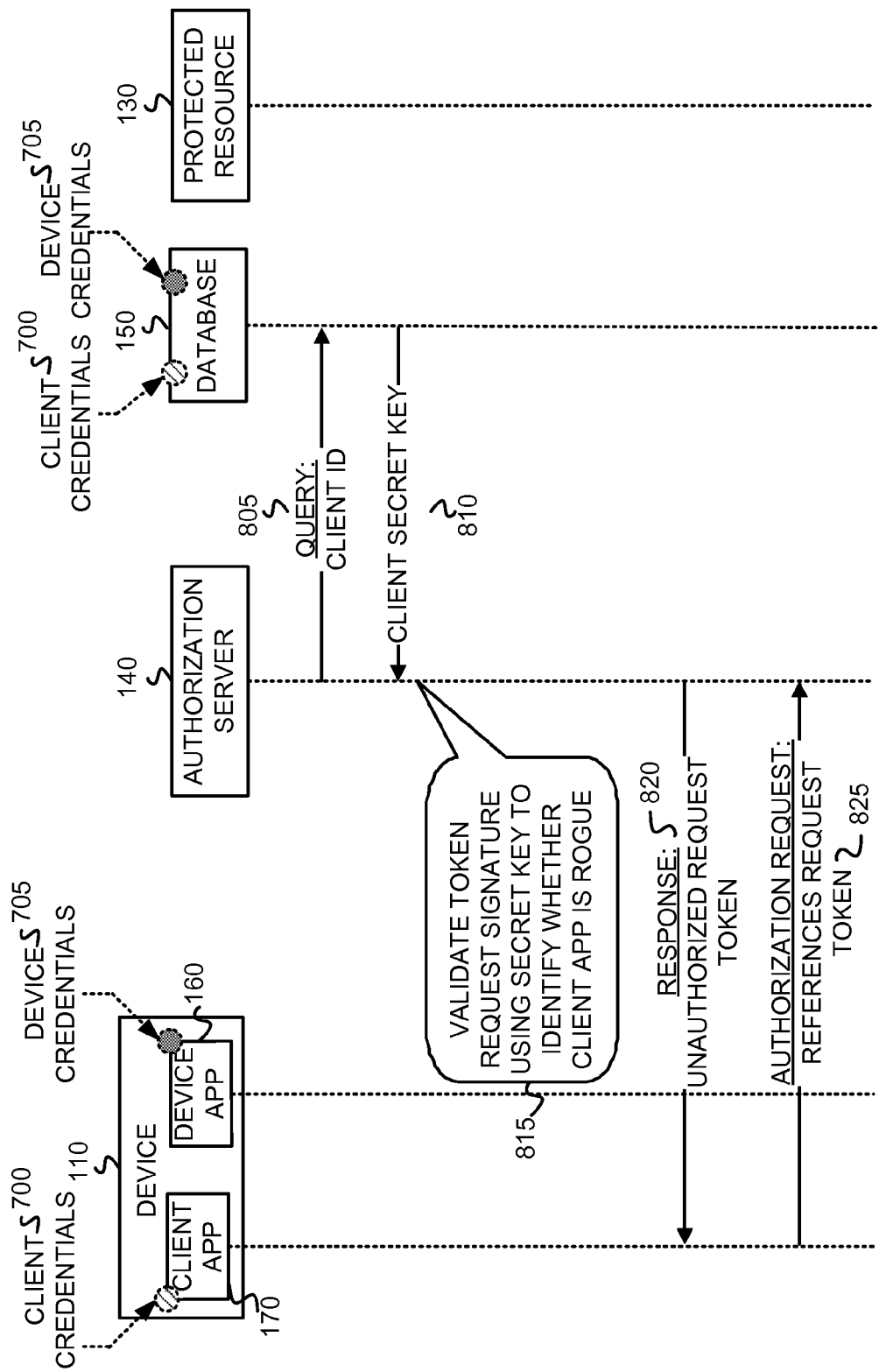

Authorization server 140 may send a query, which includes the client ID, to database 150 to obtain the credentials of client application 170 (block 620). As shown in FIG. 8, authorization server 140 may forward the client ID, received from device 110 in block 600, to database 150 via query message 805. Authorization server 140 may receive a client secret key from database 150 (block 622). Upon receipt of the query message from authorization server 140, database 150 may use the client ID contained in the query message to retrieve a client secret key. This client secret key includes the client secret key shared between device 110 and authorization server 140 in the exemplary process of FIG. 4. As shown in FIG. 8, database 150, database 150 may return a message 810 containing the client secret key to authorization server 140.

Authorization server 140 may validate the signature contained in the token request message from the client application using the client secret key (block 625). Authorization server 140 may use known signature validation techniques to validate the signature contained in the token request message based on the client secret key received from database 150. As shown in FIG. 8, authorization server 140 may validate 815 the signature from the token request message using the client secret key to identify whether the client application is rogue. A determination may be made whether the validation of the signature is successful (block 627). If not (NO—block 627), then client application 170 may be identified as rogue (block 630). If validation of the signature is successful (YES—block 627), then authorization server 140 may send a response with an unauthorized response token to client application 170 (block 632). As shown in the messaging diagram of FIG. 8, authorization server 140 may send a response message 820 that includes an unauthorized request token.

Authorization server 140 may receive an authorization request, which references the request token of block 632, from client application 170 (block 635). As shown in FIG. 8, client application 170 may, subsequent to receiving response message 820 that includes the unauthorized request token, may send an authorization request message 825 that references the unauthorized request token received from authorization server 140.

Figure 9:
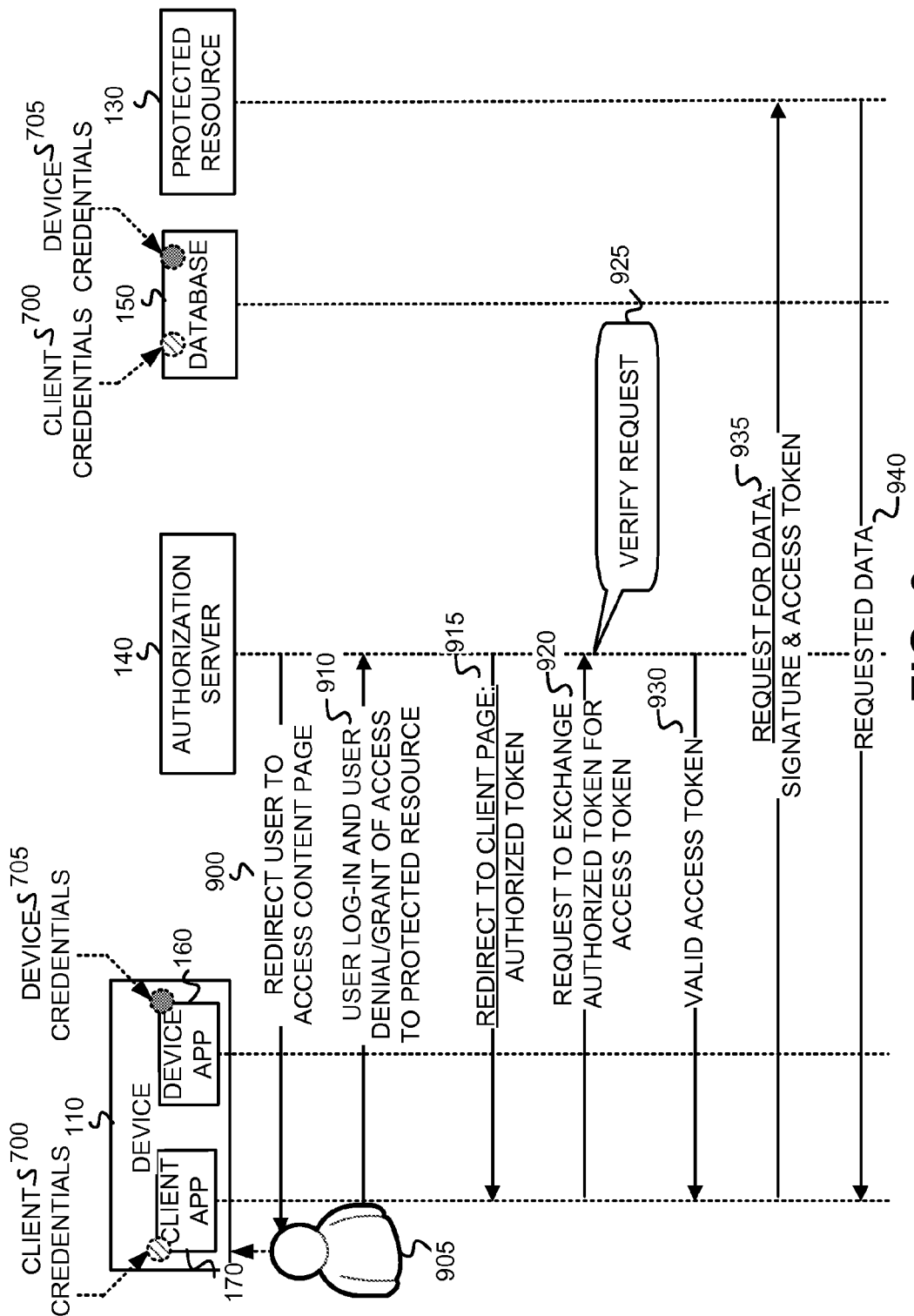

Authorization server 140 may redirect the user, associated with device 110, to a server authorization page (block 637). Based on receipt of the authorization request, that references the request token returned from authorization server 140 to client application 170, authorization server 140 may redirect the user to the server authorization page. As shown in FIG. 9, authorization server 140 may redirect 900 user 905, associated with device 110, to a server authorization page.

Authorization server 140 may receive a user log-in, and the user's denial or grant of limited access to the protected resource by client application 170, via the server authorization page (block 640). As shown in the messaging diagram of FIG. 9, authorization server 140 may receive user 905's log-in 910 and denial or grant of access to the protected resource via the server authorization page. The server authorization page, therefore, enables the user of device 110 to have some authority over whether client application 170 is granted access to data at protected resource(s) 130.

A determination may be made whether the user granted access to the protected resource (block 642). If not (NO—block 642), authorization server 140 may deny client application 170 access to the protected resource (block 645). Denying client application 170 access to the protected resource may include authorization server 140 returning a denial message to device 110, and refusing to return a valid access token to device 110.

If the user has granted access to the protected resource (YES—block 642), then the user may be redirected to a client page, the redirect including an authorized request token (block 647). As shown in FIG. 9, authorization server 140 may redirect 915 the user to a client page that includes the authorized request token. Authorization server 140 may receive a request from client application 170 to exchange the authorized token for an access token (block 650). Client application 170 may return the authorized request token to authorization server 140 to obtain the valid access token that client application 170 may use to retrieve data from protected resource(s) 130. As depicted in FIG. 9, client application 170 may send a request message 920 to authorization server 140 to request an exchange of the authorized token, received by client application 170 from authorization server 140, for a valid access token.

Authorization server 140 may verify the request and return a valid access token based on verification of the request (block 652). Authorization server 140 may verify the request by determining if the authorized token contained in the message from client application 170 is a valid token (i.e., is identical to the authorized token previously sent from authorization server 140 to client application 170). As shown in FIG. 9, authorization server 140 may receive request message 920, and may verify 925 the request for the access token. As further shown in FIG. 9, authorization server 140 may return a message 930 that includes a valid access token if the request from client application 170 is verified.

The client application 170 may send a request for data, which is signed and includes the access token, to protected resource 130 (block 655). As shown in FIG. 9, client application 170 may send a message 935 that includes a request for data, which is also signed and includes the access token received from authorization server 140. Protected resource 130 may recognize the access token and provide the requested data to the requesting client application 170 (block 660). As shown in FIG. 9, protected resource 130 may return a message 940 that includes the data requested by client application 170.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 4, 6A, 6B, 6C and 6D, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, from a first device at a network device, a first client identifier that uniquely identifies a first client application installed at the first device, and a first device identifier that uniquely identifies the first device;
   generating, at the network device, a first client application secret key based on the first client identifier;
   sending, from the network device, the first client application secret key to the first client application at the first device;
   receiving a request for an access token, for accessing a protected resource, from the first client application executing on the first device, wherein the request includes the first client identifier, the first device identifier, and a first signature generated at the first device using the first client application secret key;
   performing authentication of the first client application and the first device, wherein performing authentication of the first device comprises:
      sending a first query, that includes the first device identifier, to a database to retrieve Authentication and Key Agreement (AKA) parameters, that correspond to the first device identifier, for use in authenticating the first device;
      receiving the AKA parameters from the database; and
      using the AKA parameters to authenticate the first device;
   wherein performing authentication of the first client application comprises:
      sending a second query, that includes the first client identifier, to the database to retrieve the first client application secret key,
      receiving the first client application secret key from the database, and
      attempting to validate the first signature using the first client application secret key to authenticate the first client application;
   directing a user associated with the first device to an authorization page;
   receiving the user's log-in and a denial or a grant of access to the protected resource via the authorization page; and
   returning a valid access token to the first client application, based on a successful authentication of the first client application and the first device and based on whether the grant of access to the protected resource is received via the authorization page, to enable the first client application access to the protected resource.

2. The method of claim 1, wherein the first device identifier comprises one of: an International Mobile Subscriber Identity (IMSI), an International Mobile Equipment Identities (IMEI), a Mobile Equipment Identifier (MEID), an Electronic Serial Number (ESN), a Mobile Station International Subscriber Directory Number (MSISDN), a Medium Access Control (MAC) address, or an Internet Protocol Multimedia Subsystem Private Identifier (IMPI).

3. The method of claim 1, further comprising:
   identifying the first device as rogue if the authentication of the first device fails.

4. The method of claim 1, wherein, if the attempt to validate the signature using the first client application secret key is not successful, then the authentication of the first client application fails.

5. The method of claim 1, wherein, if the denial of access to the protected resource is received via the authorization page, the first client application is denied access to the protected resource.

6. The method of claim 1, further comprising:
   receiving, from the first device at the network device, a second client identifier that uniquely identifies a second client application installed at the first device, and the first device identifier;
   generating, at the network device, a second client application secret key based on the second client identifier;
   sending, from the network device, the second client application secret key to the second client application at the first device;

receiving a second request for an access token, for accessing a protected resource, from the second client application executing on the first device, wherein the second request includes the second client identifier, the first device identifier, and a second signature generated at the first device using the second client application key, and wherein the second client application is a different client application than the first client application;

performing authentication of the second client application and the first device; and returning a valid access token to the second client application, based on the authentication of the second client application and the first device, to enable the second client application access to the protected resource.

7. The method of claim 6, wherein performing authentication of the second client application comprises:

sending a third query, that includes the second client identifier, to the database to retrieve the second client application secret key, receiving the second client application secret key from the database, and attempting to validate the second signature using the second client application secret key to authenticate the second client application.

8. The method of claim 1, further comprising:

receiving, from a second device at the network device, a second client identifier that uniquely identifies a second client application installed at the second device, and a second device identifier that uniquely identifies the second device, wherein the second device is different than the first device;

generating, at the network device, a second client application secret key based on the second client identifier;

sending, from the network device, the second client application secret key to the second client application at the second device;

receiving a second request for an access token, for accessing a protected resource, from the second client application executing on the second device, wherein the second request includes the second client identifier, the second device identifier, and a second signature generated at the second device using the second client application key;

performing authentication of the second client application and the second device; and returning a valid access token to the second client application, based on the authentication of the second client application and the first device, to enable the second client application access to the protected resource.

9. The method of claim 8, wherein performing authentication of the second device comprises:

sending a third query, that includes the second device identifier, to a database to retrieve Authentication and Key Agreement (AKA) parameters, that correspond to the second device identifier, for use in authenticating the second device;

receiving the AKA parameters from the database; and using the AKA parameters to authenticate the second device.

10. The method of claim 9, wherein performing authentication of the second client application comprises:

sending a fourth query, that includes the second client identifier, to the database to retrieve the second client application secret key, receiving the second client application secret key from the database, and attempting to validate the second signature using the second client application secret key to authenticate the second client application.

11. A network device, comprising:

a communication interface connected to an external network;

a memory configured to store instructions;

a hardware processing unit configured to execute the instructions stored in the memory to:

receive, from a first device via the communication interface, a first client identifier that uniquely identifies a first client application installed at the first device, and a first device identifier that uniquely identifies the first device, generate a first client application secret key based on the first client identifier, send, to the first client application at the first device via the communication interface, the first client application secret key, receive, via the communication interface, a request for an access token for accessing a protected resource from the first client application executing on the first device, wherein the request includes the first client identifier, the first device identifier, and a first signature generated at the first device using the first client application secret key, perform authentication of the first client application and the first device, wherein, when performing authentication of the first device, the hardware processing unit is further configured to:

send, via the communication interface, a first query, that includes the first device identifier, to a database to retrieve Authentication and Key Agreement (AKA) parameters, that correspond to the first device identifier, for use in authenticating the first device, receive, via the communication interface, the AKA parameters from the database, and use the AKA parameters to authenticate the first device, wherein, when performing authentication of the first client application, the hardware processing unit is further configured to:

send a second query, that includes the first client identifier, to a database to retrieve the first client application secret key, receive the first client application secret key from the database, and attempt to validate the first signature using the first client application secret key to authenticate the first client application, direct a user associated with the first device to an authorization page, receive the user's log-in and a denial or a grant of access to the protected resource via the authorization page, and return a valid first access token to the first client application via the communication interface, based on the authentication of the first client application and the first device and based on whether the grant of access to the protected resource is received via the authorization page, to enable the first client application access to the protected resource.

12. The network device of claim 11, wherein the first device identifier comprises one of: an International Mobile Subscriber Identity (IMSI), an International Mobile Equipment Identities (IMEI), a Mobile Equipment Identifier (MEID), an Electronic Serial Number (ESN), a Mobile Station International Subscriber Directory Number (MSISDN), a Medium Access Control (MAC) address, or an Internet Protocol Multimedia Subsystem Private Identifier (IMPI).

13. The network device of claim 11, wherein the hardware processing unit is further configured to:
   identify the first device as rogue if the authentication of the first device fails.

14. The network device of claim 11, wherein, if the attempt to validate the signature using the client application secret key is not successful, then the authentication of the first client application fails.

15. The network device of claim 11, wherein, if the denial of access to the protected resource is received via the authorization page, the first client application is denied access to the protected resource.

16. The network device of claim 11, wherein the hardware processing unit is further configured to execute the instructions stored in the memory to:
   receive, from the first device via the communication interface, a second client identifier that uniquely identifies a second client application installed at the first device, and the first device identifier,
   generate a second client application secret key based on the second client identifier;
   send, to the second client application at the first device via the communication interface, the second client application secret key,
   receive, via the communication interface, a second request for an access token, for accessing a protected resource, from the second client application executing on the first device, wherein the second request includes the second client identifier, the first device identifier, and a second signature generated at the first device using the second client application key, and wherein the second client application is a different client application than the first client application,
   perform authentication of the second client application and the first device, and
   return a valid access token to the second client application via the communication interface, based on the authentication of the second client application and the first device, to enable the second client application access to the protected resource.

17. The network device of claim 11, wherein the hardware processing unit is further configured to execute the instructions stored in the memory to:
   receive, from a second device via the communication interface, a second client identifier that uniquely identifies a second client application installed at the second device, and a second device identifier that uniquely identifies the second device, wherein the second device is different than the first device,
   generate a second client application secret key based on the second client identifier,
   send, to the second client application at the second device via the communication interface, the second client application secret key,
   receive, via the communication interface, a second request for an access token, for accessing a protected resource, from the second client application executing on the second device, wherein the second request includes the second client identifier, the second device identifier, and a second signature generated at the second device using the second client application key,
   perform authentication of the second client application and the second device, and
   return a valid access token to the second client application via the communication interface, based on the authentication of the second client application and the first device, to enable the second client application access to the protected resource.

18. The network device of claim 16, wherein, when performing authentication of the first client application, the hardware processing unit is further configured to execute the instructions stored in the memory to:
   send, via the communication interface, a third query, that includes the second client identifier, to the database to retrieve the second client application secret key,
   receive, via the communication interface, the second client application secret key from the database, and
   attempt to validate the second signature using the second client application secret key to authenticate the second client application.

19. The network device of claim 17, wherein, when performing authentication of the second device, the hardware processing unit is further configured to execute the instructions stored in the memory to:
   send, via the communication interface, a third query, that includes the second device identifier, to a database to retrieve Authentication and Key Agreement (AKA) parameters, that correspond to the second device identifier, for use in authenticating the second device;
   receive, via the communication interface, the AKA parameters from the database, and use the AKA parameters to authenticate the second device.

20. The network device of claim 19, wherein, when performing authentication of the second client application, the hardware processing unit is further configured to execute the instructions stored in the memory to:
   send, via the communication interface, a fourth query, that includes the second client identifier, to the database to retrieve the second client application secret key,
   receive, via the communication interface, the second client application secret key from the database, and
   attempt to validate the second signature using the second client application secret key to authenticate the second client application.

* * * * *